United States Patent [19]

Kelley et al.

[11] Patent Number: 5,402,533
[45] Date of Patent: Mar. 28, 1995

[54] METHOD AND APPARATUS FOR APPROXIMATING A SIGNED VALUE BETWEEN TWO ENDPOINT VALUES IN A THREE-DIMENSIONAL IMAGE RENDERING DEVICE

[75] Inventors: Michael W. Kelley, San Mateo; Stephanie L. Winner, Santa Clara, both of Calif.

[73] Assignee: Apple Computer, Inc., Cupertino, Calif.

[21] Appl. No.: 51,473

[22] Filed: Apr. 22, 1993

[51] Int. Cl.$^6$ .............................................. G06F 15/72
[52] U.S. Cl. .................................. 395/126; 395/127; 364/723
[58] Field of Search ............................ 364/723, 715.01; 395/143, 141, 139, 131, 127, 126, 129, 133, 135, 121, 122

[56] References Cited

U.S. PATENT DOCUMENTS

| | | | |
|---|---|---|---|
| 4,594,673 | 6/1986 | Holly | 395/121 |
| 4,658,247 | 4/1987 | Gharachorloo | 345/196 |
| 4,697,178 | 9/1987 | Heckel | 395/122 |
| 4,815,009 | 3/1989 | Blatin | 395/129 |
| 4,866,637 | 9/1989 | Gonzalez-Lopez et al. | 395/126 |
| 4,885,703 | 12/1989 | Deering | 395/122 |
| 4,897,803 | 1/1990 | Calarco et al. | 395/166 |
| 4,945,500 | 7/1990 | Deering | 395/122 |
| 5,001,651 | 3/1991 | Rehme et al. | 395/126 |
| 5,115,402 | 5/1992 | Matsushiro et al. | 395/141 |
| 5,123,085 | 6/1992 | Wells et al. | 395/121 |
| 5,128,872 | 7/1992 | Malachowsky et al. | 395/162 |
| 5,157,388 | 10/1992 | Kohn | 364/723 |
| 5,214,753 | 5/1993 | Lee et al. | 395/125 |
| 5,222,204 | 6/1993 | Swanson | 364/723 |
| 5,249,264 | 9/1993 | Matsumoto et al. | 395/134 |
| 5,253,335 | 10/1993 | Mochizuki et al. | 395/122 |
| 5,261,041 | 11/1993 | Susman | 395/152 |
| 5,268,995 | 12/1993 | Diefendorff et al. | 395/122 |
| 5,278,949 | 1/1994 | Thayer | 395/126 |

OTHER PUBLICATIONS

"Computer Graphics Principles and Practice Second Edition", by Foley, Van Dam, Feiner and Huges, published by the Addison Wesley Publishing Corp., pp. 885–886 and pp. 899–900.

"Pyramidal Parametrics", by Lance Williams, Computer Graphics vol. 17 No. 3, Jul. 1983.

Oka, Masaaki, et al., "Real–Time Manipulation of Texture–Mapped Surfaces," Computer Graphics, vol. 21, No. 4, pp. 181–188 (Jul. 1987).

Deering, Michael, et al., "The Triangle Processor and Normal Vector Shader: A VLSI System for High Performance Graphics," Computer Graphics, vol. 22, No. 4, pp. 21–30 (Aug. 1988).

Kirk, David, et al., "The Rendering Architecture of the DN10000VS," Computer Graphis, vol. 24, No. 4, pp. 299–307 (Aug. 1990.).

Fuchs, Henry, et al., "Pixel–Planes 5: A Heterogeneous Multiprocessor Graphics System Using Processor Enhanced-Memories," Computer Graphics, vol. 22, No. 4, pp. 239–246(Aug. 1988).

Akeley, Kurt, et al., "High–Performance Polygon Rendering," Computer Graphics, vol. 22, No. 4, pp. 239–246 (Aug. 1988).

*Primary Examiner*—Paul P. Gordon
*Assistant Examiner*—Emmanuel L. Moise
*Attorney, Agent, or Firm*—Blakely, Sokoloff, Taylor & Zafman

[57] ABSTRACT

A method and apparatus for providing a correctly signed result of a linear interpolation (LIRP) function in a compute controlled display system. A correctly signed LIRP evaluation may be performed by simply adding a bias to each of the operands of the LIRP function and subtracting the bias to the result. Adding the bias is achieved by inverting the high (sign) bit of each of the operands. Subtracting the bias is achieved by inverting the high (sign) bit of the result.

17 Claims, 6 Drawing Sheets

METHOD AND APPARATUS FOR APPROXIMATING A SIGNED VALUE BETWEEN TWO ENDPOINT VALUES IN A THREE-DIMENSIONAL IMAGE RENDERING DEVICE

BACKGROUND OF THE INVENTION

1. Field of the Invention

The present invention relates to the field of computer controlled display systems, in particular, interpolation for use in rendering pixels for displaying 3-dimensional graphical images.

2. Description of the Related Art

As the processing capability of computer systems has grown, so have the ways of displaying data generated by the computer systems. Many vocations now use computer systems as a fundamental tool. For example, in the area of architectural design, 3-Dimensional graphical images (or 3-D images) of buildings or other structures are dynamically created and manipulated by a user. A computer system is able to capture and process data in order to display the 3-D image, in a time that is much faster than could be done manually. As computer hardware technology has advanced, so has the development of various methods, techniques and special purpose devices for rapidly displaying and manipulating 3-D images. An exemplary 3-D rendering system is described in co-pending application Ser. No. 07/811,570 now U.S. Pat. No. 5,345,541, entitled "Method and Apparatus For Simultaneously Rendering Multiple Scanlines", which is assigned to the assignee of the present application.

A 3-D image is represented in a computer system as a collection of graphical objects, e.g. polygons. Each of these polygons is spatially defined as a set of points. Associated with each point are pixel shading values. Identification of other points within the polygon is typically done by linear interpolation of the given set of points.

Performing the linear interpolation calculations for each point is very compute intensive. To minimize computation the rendering is typically done using a forward differencing calculation. Consider the case of interpolating to find pixel shading values across a row or span of an object. In forward differencing, a constant, say $\Delta p$ is determined that is between each horizontal coordinate (e.g. using the formula $\Delta p = P1 - P0/Y1 - Y0$, where P1 and P0 are pixel shading values at endpoints Y1 and Y0 of an edge). Thus, when calculating pixel shading values across a row, the next pixel shading value may be determined by simply adding $\Delta p$ to the previous pixel shading value.

The forward differencing technique i premised on the idea that it is desirable to minimize the number of complications that need to be performed. The tradeoff is that a larger amount of data must be moved and stored within the system (e.g. the pixel shading values for prior pixels and the corresponding interpolation constant for each pixel shading component)

With the maturation of semiconductor technology, the cost of circuitry to perform such division operations has decreased while the speed has increased. Thus, it has become viable to design system that utilize processing power and minimize memory requirements. This is especially desirable in the design of integrated circuits where memory can take p a sizable amount of valuable space. Thus, it would be desirable to provide a method and means where these linear interpolations may be directly performed in an efficient manner.

Direct linear interpolation (LIRP) is accomplished by performing the function:

$$(1-w)A + wB.$$

The values A and B are the extreme/endpoint values. The value w is an interpolation weighting value in the range $0 \leq w \leq 1$. The weighting value w specifies a linear "blend" of the values A and B. For generation of acceptable graphical images, the result of this expression must be A if w is zero and must be B if w is one. A level of error is acceptable between A and B when w is a positive fraction less than one.

It is important when performing this calculation that the result has the correct sign. One way for assuring that the result has the correct signs is to sign extend the hardware circuitry performing the calculation. Sign extension requires that each adder, multiplier; multiplexer, etc. be extended in high bits by replicating the sign to align with the sign bit of the result. Extended width operands, are wasteful in many instances. Thus it is desirable to provide an efficient and fast method and means for directing calculating the signed LIRP function without sign extension.

SUMMARY

A method and apparatus for providing a correctly signed result of a Linear Interpolation (LIRP) function in a computer controlled display system, is disclosed. The method eliminates the need to sign extend any intermediate results when generating the interpolated result. Generally, the method requires the steps of: converting the endpoint value from decimal format to two's complement binary form; causing each end Joint value to be positive by adding a predetermined bias; performing the interpolation function to generate an interpolation bias; subtracting the bias from the interpolation result; converting the interpolation result from the two's complement form into the decimal format.

The bias that is added and subtracted is equal $2^{n-1}$, where n is the number of bits in the numeric format being used. Aiding and subtracting the bias is accomplished by simply inverting the high order (sign) bit of the respective values.

DETAILED DESCRIPTION OF THE PREFERRED EMBODIMENT

A method and apparatus for performing a signed linear interpolation (LIRP) function in a computer controlled display system is described. In the following description, numerous specific details are set forth such as the rendering techniques implemented in order to provide a thorough understanding of the present invention. It will be apparent, however, to one skilled in the art that the present invention may be practiced without these specific details. In other instances, well-known circuits, control logic and coding techniques have not been shown in detail in order not to unnecessarily obscure the present invention.

Overview of the Computer System of the Preferred Embodiment

Figure 1:
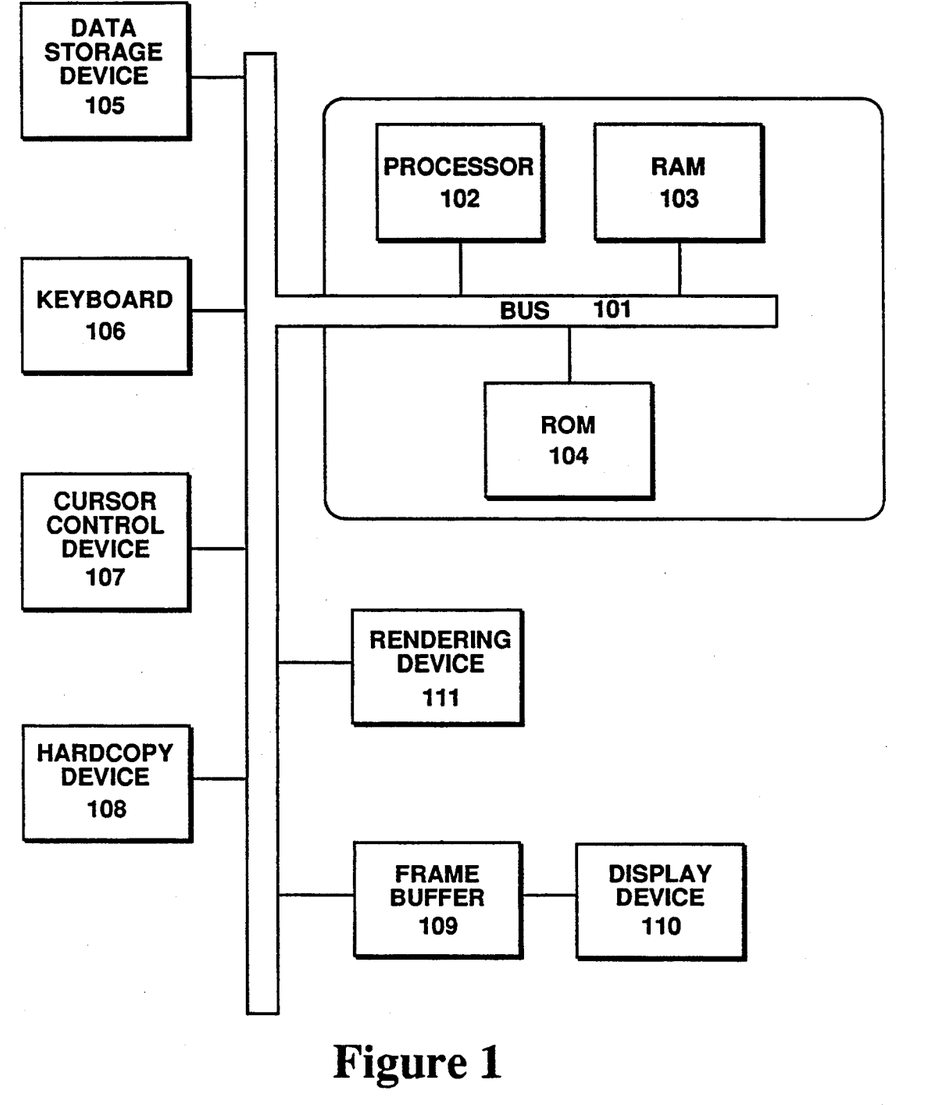
FIG. 1 illustrates a computer system as may be utilized by the preferred embodiment of the present invention.

The computer system of the preferred embodiment is described with reference to FIG. 1. The present invention may be implemented on a general purpose microcomputer, such as one of the members of the Apple ® Macintosh ® family, an IBM compatible Personal Computer, or one of several work-station or graphics computer devices which are presently commercially available. In any event, a computer system as may be utilized by the preferred embodiment generally comprises a bus or other communication means 101 for communicating information, a processing means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc., coupled to said bus 101 for communicating information and command selections to said processor 102 and for controlling cursor movement. Additionally, it is useful if the system includes a hardcopy device 108, such as a printer, for providing permanent copies of information. The hardcopy device 108 is coupled with the processor 102 through bus 101.

Also coupled to the computer system of the preferred embodiment is a frame buffer 109 which is further coupled to a display device 110. The display device is preferably capable of displaying color graphics images or high resolution monochrome images. The frame buffer 109 contains the pixel data for driving the display device 110. The display device 110 would be further coupled to a rendering device 111, also known as a graphics accelerator. Typically, such a rendering device 111 is coupled to the bus 101 for communication with the processor 102 and frame buffer 109. The preferred embodiment is implemented for use on a Macintosh computer available from Apple Computer, Inc. of Cupertino, Calif.

The linear interpolation circuit of the of the currently preferred embodiment of the present invention is implemented within the rendering device 111.

Rendering Architecture of the Preferred Embodiment

The preferred embodiment of the present invention utilizes a scanline approach to rendering. From a computer stem design standpoint, the principle advantages in utilizing a scanline approach are the reduction of bandwidth between the graphics accelerator and the host/frame buffer, reduced requirements for low latency communication between the graphics accelerator and the host/frame buffer, and increased coherence of the data transferred from the graphics accelerator and the host/frame buffer. Moreover, for a given desired performance of the combined computer system and graphics accelerator, these advantages reduce both the cost of the computer system without the graphics accelerator and the cost of the graphics accelerator itself.

Figure 2:
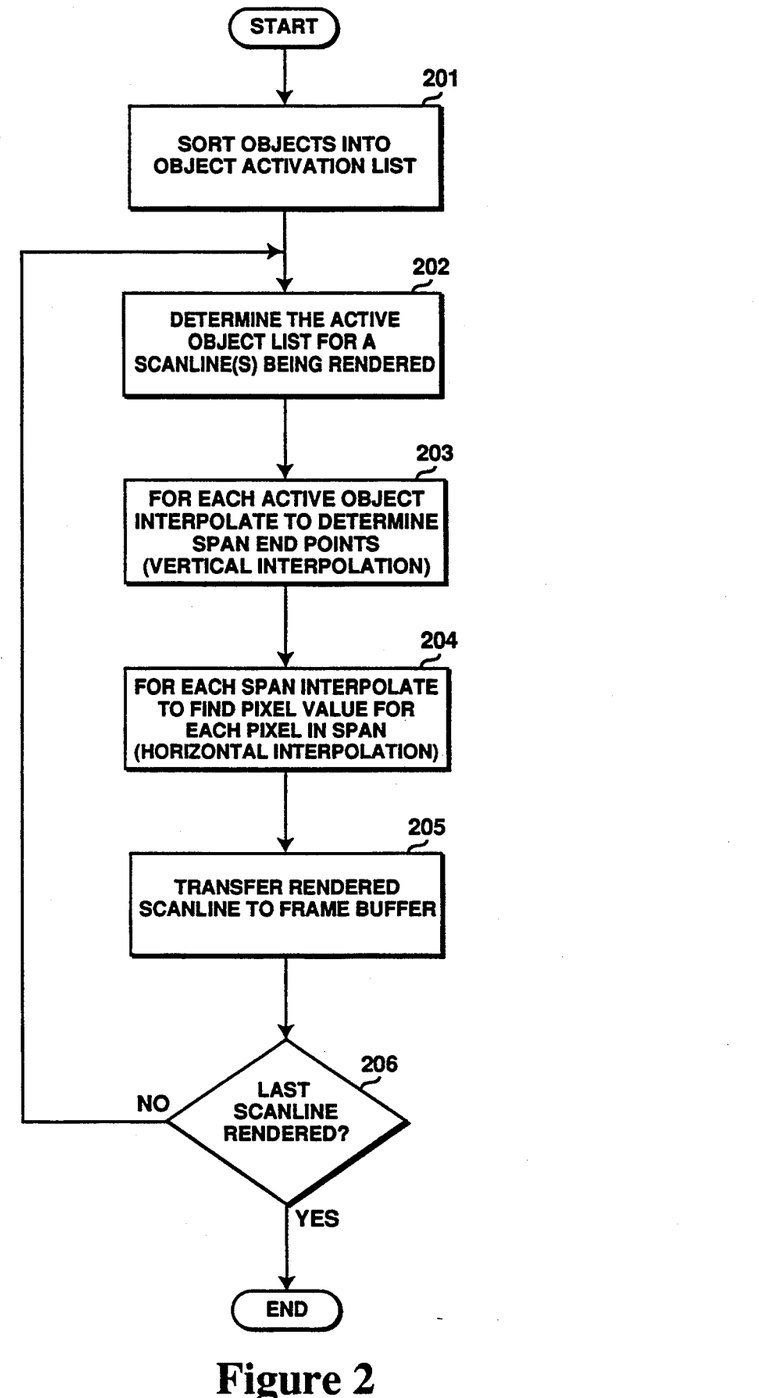
FIG. 2 is a flowchart which outlines the steps for rendering a scene in the currently preferred embodiment of the present invention.

The scanline rendering technique performed in the currently preferred embodiment is illustrated in the steps of the flowchart of FIG. 2. Referring to FIG. 2, the objects (triangles or quadrilaterals) representing the image to be generated are first sorted so as to identify the scanline on which an object first becomes active (i.e. displayed), step 201. The result of this sorting is a database that is termed the Object Activation List. As the scanlines are being rendered, the Object Activation List is queried to determine if any new objects appear on a scanline that is about to be rendered.

Once the Object Activation List is created rendering of the scanlines may begin. The first step is to generate an Active Object List for the scanline to be rendered, step 202. The Active Object List identifies the objects which are "active" or lie on the scanline(s) that is about to be rendered. Creation and maintenance of the Active Object List occurs by examining the Object Activation List for new objects to be added and eliminating objects that have been completely rendered. Determining tile objects that have been completely rendered is a simple matter of identifying objects with a bottom coordinate point that is "above" the scanline being rendered (as scanlines are rendered from top to bottom.

For each active object, a span of pixels on the horizontal coordinates of scanline being rendered must be identified, step 203. This process is termed vertical interpolation. In vertical interpolation, the horizontal coordinates of intersection points of two edges of the object with the scanlines being rendered are identified. The two intersection points define the endpoints for the span. Note that not only the spatial values need to be determined, but the pixel shading values associated with the intersections points must be calculated. In both instances, this is done by some type of interpolation (e.g. linear interpolation).

For each active object, the pixel shadings of the span of the object on the scanline being rendered are determined step 204. Again, this is done by interpolating for each point (pixel) on the span given the two extreme endpoints. This is termed horizontal interpolation. During this step, such things as Z-buffering, ambient shading, lighting and other effects may be performed to determine the ultimate pixel shading. After each of the objects has been rendered and other pixel shading functions performed, e.g. texture mapping, the rendered scanline is transferred to a system frame buffer, step 205.

Finally, a check to determine if the last scanline has been rendered, step 206. If the last scanline has not been rendered, the method continues at step 202 for the next scanline. Otherwise, the rendering of the image has been completed.

It should be noted that the foregoing description is not meant to limit the implementations in which the present invention may be utilized. For example, it would be apparent to one skilled in the art to use the present invention in graphical systems that do not do use the scanline method of rendering. Such implementations would not depart from the spirit and scope of the present invention.

Linear Interpolation Function

From the foregoing description, it is clear that a LIRP function is performed continually through the rendering process. A technique for performing the LIRP function is described in co-pending application Ser. No. 07/811,829 now U.S. Pat. No. 5,345,541 entitled "Method and Apparatus For Approximating A Value Between Two Endpoint Values In A Three Dimensional Image Rendering Device", which is assigned to the assignee of the present invention. In the technique described, numerous intermediate results are generated. It is critical when performing these intermediate calculations that the result has the correct sign.

The equation for direct LIRP function is defined as:

$$(1-w)A+wB.$$

The LIRP function requires a weighting value w. The weighting value w is a value between 0 and 1 that specifies a linear "blend" of the values A and B. The weighting value w can be unique for each interpolated value being calculated. Generally w will have a relationship between the end points A and B and the position of the point being interpolated relative to A and B. The result of this expression is A if w is zero, B if w is one, and a value between A and B when w is a positive fraction less than one.

The LIRP operates in fixed precision arithmetic. Implementing the LIRP operation in fixed precision arithmetic can be wasteful. If w is defined as a binary fraction between zero and one inclusive almost an entire bit of resolution is wasted. In the case where w has 4 bits, 7 encodable values between 1.001 and 1.111 will always be unused.

A more efficient approach to encoding w defines 0.1111 to be one and 0.0000 to be zero. All 16 encodable values where w has 4 bits are now useful. The LIRP equation now becomes:

$$(0.1111-w)A+wB$$

If w=0.0000, the LIRP value will be 0.1111A. If w=0.1111, the LIRP value will be 0.1111B. However, in graphics applications it is known that in order to achieve high quality rendering, if w=0 or 0.0000, the LIRP value must be A and if w=1 or 0.1111, the LIRP value must be B. This is to achieve complete color saturation at the end points. A rounding factor is therefore added to the LIRP value to achieve saturation at both A and B. 0.0001 A is added if w<0.1000. 0.0001B is added if w>=0.1000. These rounding factors force saturation at both ends of the range of w, while tolerating some discrepancies to true linearity at some midpoints.

With the addition of this rounding factor, w no longer partitions the range between A and B quite uniformly. The partition between the LIRP values when w=0.0111 and when w=0.1000 can be up to twice as large as the partition between any other two neighboring values of w. The size of this partition is, however, no larger than the size of every partition when w is encoded in the standard way described above.

In describing a circuit to perform the LIRP equation, the fixed point version of the LIRP equation above is re-written using two's complement math as follows:

$$(0.1111-w)A+wB$$

Replacing w with it's two's complement equivalent (!w is the bit inverse of w):

$$(0.1111+(!w+0.0001))A+wB$$

and rearranging terms:

$$(0.1111+0.0001)+(!w))A+wB$$

The first term drops out in two's complement form, leaving only:

$$(!w)A+wB$$

Not incidentally, this approach leads to a very regular (and thus compact and efficient) custom silicon layout. Converting to one bit multiplication's by summing for i=0 to n, where n is the number of bits-1 in w (4 for this example) and $w_n$ is the most significant bit of w gives:

$$\Sigma(((!w_i)A)+(w_iB))2^{i-n}$$

This equation can be efficiently computed by using a selector for each bit $w_i$ to select between adding A or B (shifted appropriately by $2^{i-n}$).

Adding in the appropriate rounding factor to force saturation gives:

$$((!w_nA)+(w_nB))2^{-n}+\Sigma((!w_iA)+(w_iB))2^{i-n}$$

Adding the rounding factors to the circuit described above is simply done by adding one new selector at the least significant bit position.

Figure 3A:
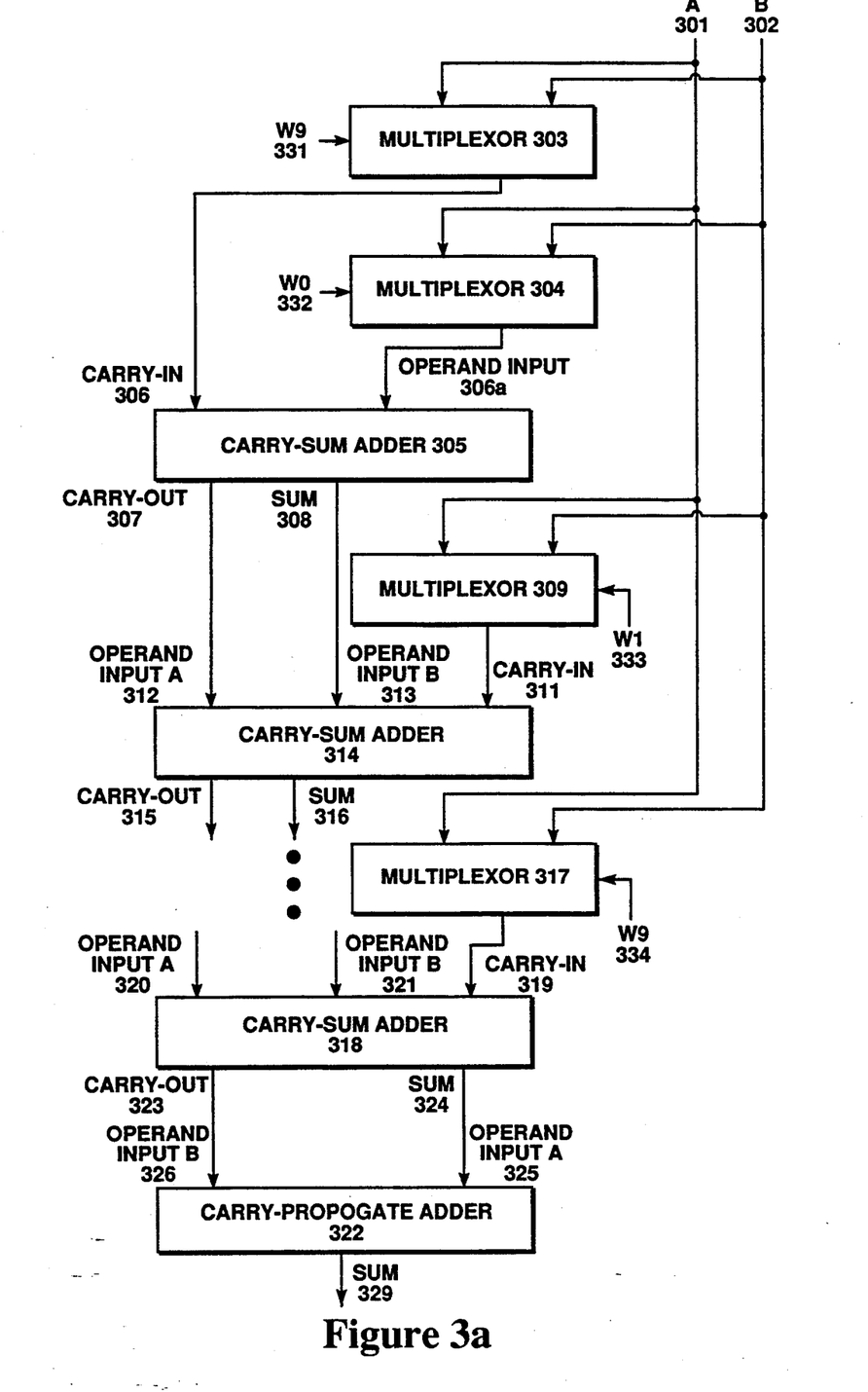
FIG. 3a is a schematic representation of a circuit for calculating an unsigned linear interpolation value as may be utilized by the preferred embodiment of the present invention.

Referring now to FIG. 3a, a circuit for linear interpolation is illustrated. The LIRP circuit is comprised essentially of 2 to 1 multiplexors, carry sum adders, and a 10 bit carry propagate adder. The LIRP circuit implements the logic described above where the bits of the Weighting Value w are used to select the output of the 2 to 1 multiplexors. The outputs of the multiplexors are added and the bit patterns are shifted appropriately to reflect the magnitude of the operands. As the circuit is somewhat repetitive, a description of a portion of the circuit will suffice.

A first input A 301 is provided as a first input to the multiplexer 303 and a second input B 302 is a second input to the multiplexer 303. The values of input A 301 and B 302 would typically be a pair of pixel shading values at some endpoint locations. A third input, i.e. a selector value, is the value which will determine whether the first input or the second input will be output from the multiplexer 303. The selector value to be provided to the multiplexor is a bit from the weighting value. For the multiplexor 303, the selection value is provided by the most significant bit of the Weighting Value w, in this case W9 331. This value is the additive saturation value needed in order to achieve full saturation at the extreme ends. In any event, it should be noted that if the selection value is a 1, the first input is output from the multiplexer, i.e. the bit pattern from B 302. If the selection value is 0 the second input is output from the multiplexer, i.e. the bit pattern from A 301.

Figure 3B:
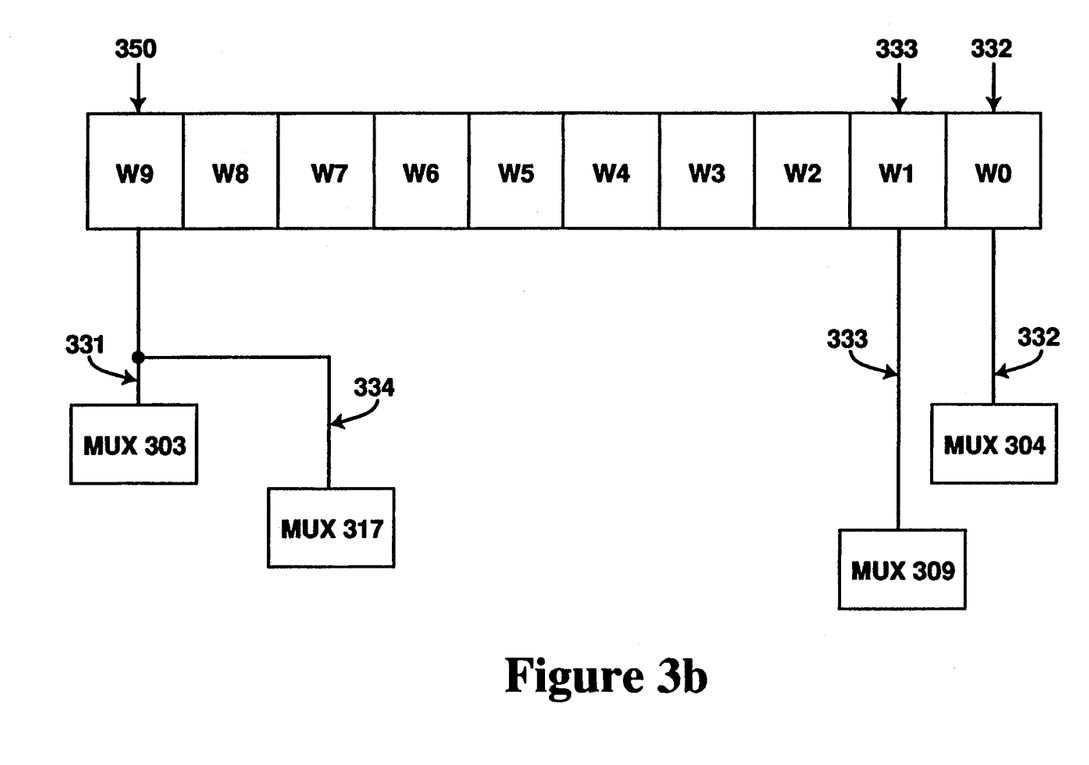
FIG. 3b illustrates the bit positions of a weighting value w.

The bit layout of the weighting value w is illustrated in FIG. 3b. As is typical in computer representations, e.g., binary representations, of numeric values, the least significant digit values are in the right most storage position. So for example, a digit W0 332 will be the least significant digit and a digit W1 333 is the second least significant digit. This continues from right to left storage locations unit W9 350, which is the most significant digit. Further illustrated in FIG. 3b are the digits of W coupled to corresponding multiplexors as described with respect to FIG. 3a.

Referring back to FIG. 3a, the output of the multiplexor 303 is coupled to a carry-in input 306 of carry-sum adder 305. It is also clear from FIG. 3a that the values A 301 and B 302 will be used as input to all the multiplexer devices.

A second multiplexer 304 also takes as input A 301 and B 302. The multiplexer 304 receives as input the least significant bit of the Weighting Value, in this case W0 332. The output of the multiplexor 304 is coupled to an operand input 306a of the carry-sum adder 305. An Unused input of carry-sum adder 305 is forced to zero (0). Alternatively, a carry-sum half adder could be utilized which has 2 inputs instead of 3.

The carry-sum adder 305 provides for the addition of the saturation value and of the lowest order set of bits in the multiplication (i.e. linear interpolation operation) it is performing. A carry out output 307 and a sum output 308 of the carry-saver adder 305 are coupled to an operand input A 312 and an operand input B 313, respectively, of carry-sum adder 314.

The multiplexor 309 takes as selector input the second least significant bit of the Weighting Value, in this case W1 333. The output of the multiplexor 309 is also an input to the carry-save adder 314.

The additive values cascade down the combination of multiplexors and carry-sum adder devices until multiplexer 317/carry-sum adder 318 are reached. In multiplexer 317, the input is the most significant bit of the weighting value, in this case W9 334. Again, input values A 301 and B 302 are inputs to the multiplexor 317.

The output of the multiplexor 317 is coupled to a carry-in input 319 of carry-sum adder 318. In accordance with the description of the circuit above, operand inputs A 320 and operand input B 321 of carry-sum adder 318 are coupled to the carry-out output and sum output, respectively, of a previous carry-sum adder (not illustrated). The carry-out output 323 and sum 324 of carry-sum adder 318 are coupled to an operand input B 326 and operand input A 325, respectively, of carry-propagate adder 322. The sum output 329 of the carry-propagate adder 322 will be the approximated linearly interpolated value.

As noted above with respect to the prior art, one technique for insuring a correct sign for a signed interpolated function, is to sign extend the devices used in carrying out the function. It is useful to discuss the effect of sign extension on the circuit of FIG. 3a. With respect to the Adders, if the result is M bits wide M is equal to (the number of bits in W)+ the larger of {(number of bits in A}, number of bits in B)}. For the multiplexor, each multiplexor output is extended using the formula: m-n-(w-bit), where m is the width of the result, n is the width of the input, w-bit is the bit number f multiplexor selection. An exception is the w-bit value which should be zero ($\phi$) for the rounding selection multiplexor. Referring to FIG. 3a, assuming n=10 and m=20, this would cause the output of multiplexors 303 and 304 to be extended by 10 bits, the output of multiplexor 309 to be extended by 9 bits and the output of multiplexor 317 to be extended by 1 bit.

As is apparent, sign extension requires a larger and slower hardware implementation. In order to perform the signed LIRP function without sign extension, a bias is added to two's compliment representations of A and B and subsequently the bias is subtracted from the final result. Adding the bias has the effect of causing all calculations to be on positive numbers (i.e. an unsigned calculation). In this instance A is represented by a two's complement format binary number $-2^n < A < 2^n$ and B is represented by a two's complement format binary number $-2^n < B < 2^n$. The bias is $2^{n-1}$. In two's complement format 0×200 200 through 0×3 ff represent the negative values: $-2^{n-1}$ through $-1$. Likewise, in two's complement format 0×1 through 0×1 ff represent the positive values: 1 through $2^{n-1}-1$. When the bias is added, the positive values become 0 through $2^n-1$. Since all the inputs are positive, it is not necessary to sign extend the intermediate sums. Adding the bias is equivalent to simply inverting the high order (sign) bit. Subtracting the bias from the result is equivalent to simply inverting the high order (sign) bit. Thus, by simply adding three inverters to the circuit of FIG. 3a, signed LIRPS can be achieved.

It should be noted that adding and subtracting the bias has no effect on the final end result of the linear interpolation function. Assume a bias d is added to each of the operands:

$$P+d=(1-w)(P0+d)+w(P1+d)=(1-w)P0+(1-w)d+wP1+wd=(1-w)P0+d-wd+wP1+wd=(1-w)P0+wP1+d$$

So when the bias d is subtracted from the result we end up with the original interpolation function $P=(1-w)P0+wP1$.

Figure 4:
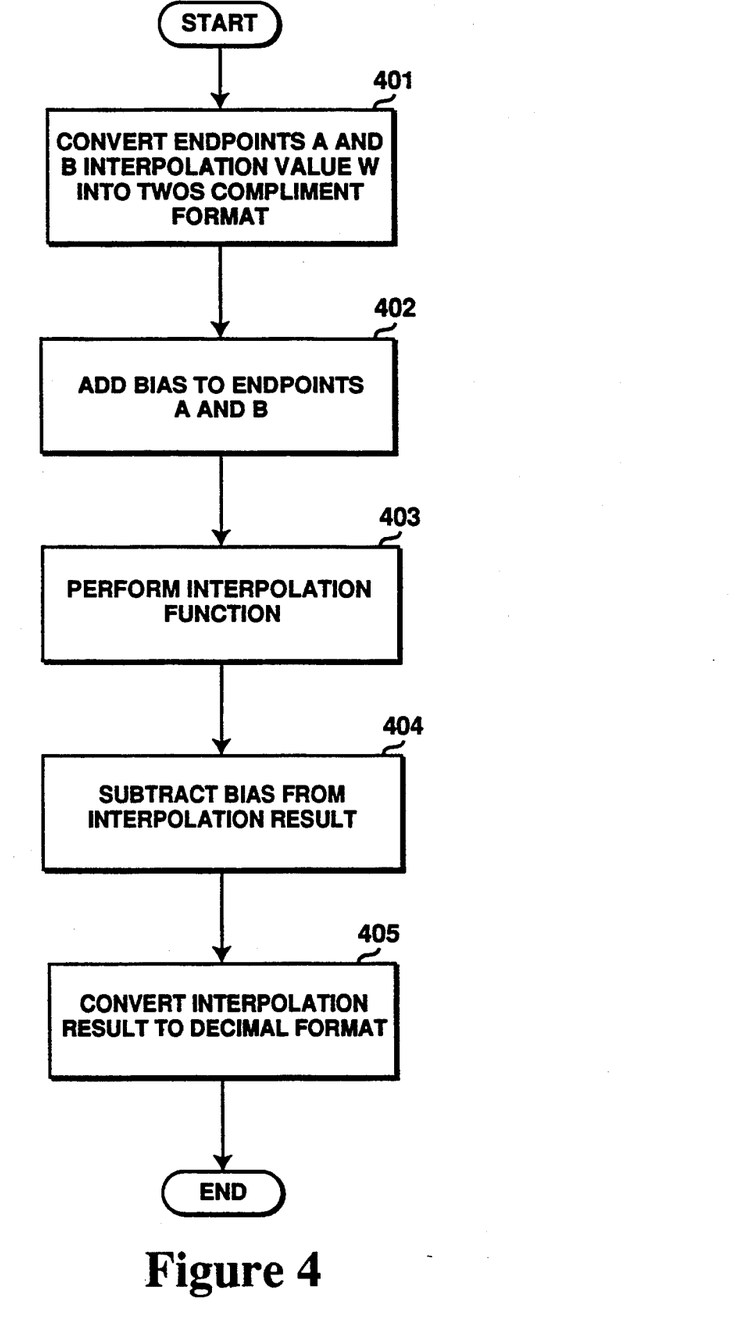
FIG. 4 is a flowchart which describes the steps for performing the signed linear interpolation of the currently preferred embodiment of the present invention.

The method for rendering a scanline is outlined in the steps of the flowchart of FIG. 4. Referring to FIG. 4, the endpoints values A and B, as well as the interpolation weights value W must be converted from decimal to a two's complement binary format, step 401. Note that this step may not be needed if the endpoint values A and B and interpolation weights value W are maintained in two's complement form. In any event, once the values are in the proper binary format, the necessary bias to make A and B positive values is added to A and B, step 402. This is done by inverting the high order (sign) bit of both A and B.

Next, the interpolation function is performed and an interpolation result obtained, step 403. Preferably, the interpolation function is performed utilizing the circuitry and technique described with reference to FIG. 3a. However, other circuitry or other techniques may be utilized without causing departure from the spirit and scope of the present invention. In any event, the bias is then subtracted from the interpolation result, step 404. This is accomplished by simply inverting the high order (sign) bit of the interpolation result. Conceptually this is true because we are merely performing the same function twice to get back to the same place, e.g. invert zero to get one and then invert one to get zero. Finally, the result in two's complement form is then converted back to it's decimal equivalent, step 405.

What follows is an example of performing the linear interpolation function in both decimal and binary. Consider an example where A=−6, B=6 and w=¼. In decimal the interpolation function would be performed as follows:

$$P(w) = (1 - w)A + wB$$
$$= (1 - 1/4)(-6) + (1/4)(6)$$
$$= -18/4 + 6/4$$
$$= -12/4$$
$$= -3$$

The binary equivalent would be as follows:
A=111111010 (2's complement form of −6)
B=000000110
w=0.01 (binary equivalent of ¼)
1−w=0.11 (binary equivalent of ¾)
when inverting the sign bit of A and B, the result is A=01111010 and B=10000110. Performing the calculations in binary:

$$(1 - w)A = .11(01111010)$$

```
    0011110.10
  + 0111101.00
   01011011.10
``` and $$wB = .01(10000110)$$
$$= 00100001.1$$

Adding the two results yields:

```
    01011011.1
  + 00100001.1
    01111101.0
```

When the high order bit is inverted, the result is 11111101, which is the 2's complement representation of the decimal number −3 (the expected result).

Figure 5:
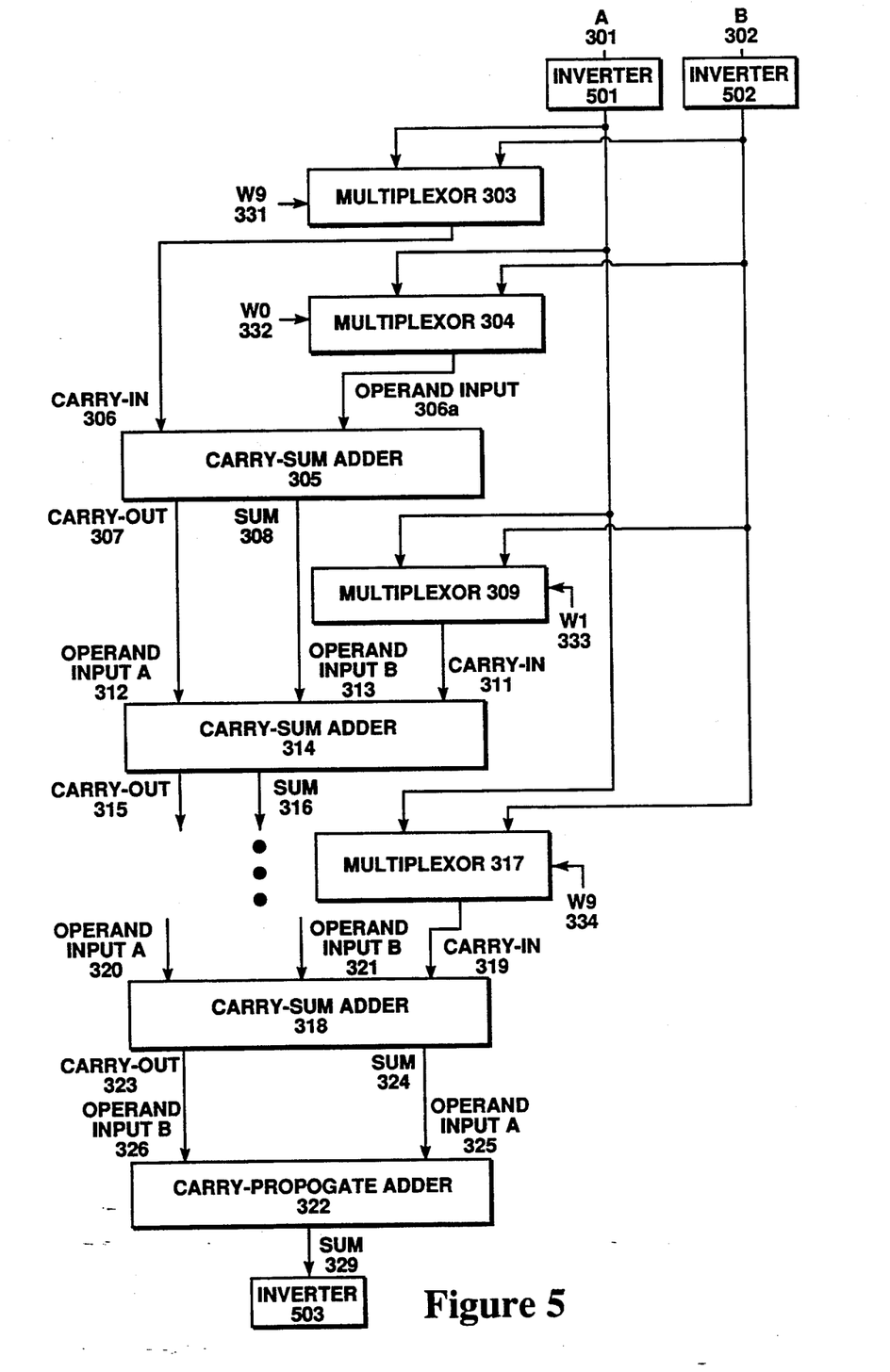
FIG. 5 is a block diagram of the circuit of FIG. 3a modified to perform the signed linear interpolation of the currently preferred embodiment of the present invention.

FIG. 5 illustrates in block diagram form, a circuit for carrying out the signed linear interpolation function of the present invention. The circuit adds inverters 501–503 to the circuitry illustrated in FIG. 3a. The input A 301 is coupled to the inverter 501, the input B 302 is coupled to the inverter B 302 and the sum 329 is coupled to the inverter 503. Each of the inverters 501, 502 and 503 will merely invert the high order sign bit of the respective inputs. Although not illustrated in FIG. 5, a means for converting the decimal values into two's complement form would be included. Such a means may be implemented by the software generating the signals.

While the currently preferred embodiment is utilized in a computer controlled display system, it would be apparent to one skilled in the art to utilize the present invention in other embodiments which perform a LIRP function.

Thus, a method and apparatus for performing signed linear interpolations is disclosed.

We claim:

1. In a pixel rendering system for generating pixel values for the display of an image on a display device, said pixel rendering system being coupled to said display device, said image being represented as a plurality of objects, a method for displaying a pixel on said display device comprising the steps of:

obtaining an interpolation weight W having one or more bits;

retrieving a first endpoint value from a first circuit, said fast endpoint value corresponding to a first pixel value of a fast portion of an object;

a processor, being coupled to said first circuit, generating a first result by adding a bias value to said first endpoint value;

providing a second endpoint value corresponding to a second pixel value of a second portion of said object;

generating a second result by adding said bias value to said second endpoint value;

generating an interpolation result from said interpolation weight W, said first result and said second result;

generating a pixel signal corresponding to a third result, said third result generated by subtracting said bias value from said interpolation result; and displaying said pixel using said pixel signal on said display device.

2. The method of claim 1 wherein said first pixel value is a pixel shading value.

3. The method of claim 1 wherein said first portion of said object is included in a scanline of said image.

4. The method of claim 3 wherein said second portion of said object is included in said scanline of said image.

5. The method of claim 1 wherein said fast endpoint value is represented in a decimal format.

6. The method of claim 1 wherein said first result is represented in two's complement format.

7. The method as recited in claim 1 wherein said first endpoint value is comprised of a plurality of bits, including a first high order bit, and the step of generating a fast result includes a step of inverting said first high order bit of said first endpoint value.

8. The method as recited in claim 1 wherein said second endpoint value is comprised of a plurality of bits, including a second high order bit, and said step of generating a second result includes a step of inverting said second high order bit of said second endpoint value.

9. The method as recited in claim 1 wherein said interpolation result is further comprised of a plurality of bits, including a third high order bit, and said step of generating said pixel signal includes a step of inverting said third high order bit of said interpolation result.

10. The method as recited in claim 1 wherein said first endpoint value, said second endpoint value and said interpolation result each have N bits and said bias value is the value $2^{N-1}$.

11. A circuit for generating a signal corresponding to a pixel value, said circuit comprised of:

a first circuit having as inputs a bias signal and a first endpoint signal and a second endpoint signal, said first endpoint signal corresponding to a pixel value, said second endpoint signal corresponding to a second pixel value, said first circuit having as outputs a first result and a second result, said first result corresponding to a sum of said bias signal with said first endpoint signal, said second result corresponding to a sum of said bias signal with said second endpoint signal;

a second circuit having as inputs said first result and said second result, said second circuit having as an output a third result corresponding to an interpolation result between said first result and said second result; and a third circuit having as inputs said third result and said bias signal, said third circuit having as an output said signal corresponding to said bias signal subtracted from said third result.

12. The circuit as recited in claim 11 wherein said first circuit includes a circuit for inverting a high order bit of said first endpoint signal and said second endpoint signal.

13. The circuit as recited in claim 11 wherein said third circuit includes a circuit for inverting a high order bit of said third result.

14. In a computer system, said computer system including a processor coupled to a display, a method for generating and displaying a pixel signal corresponding to a pixel value for a portion of an image, said portion of an image having a first endpoint and a second endpoint, said method comprising the steps of:

providing a first endpoint signal corresponding to said first endpoint, and a second endpoint signal corresponding to said second endpoint, said first endpoint signal representing a floating point decimal format, said second endpoint signal representing said floating point decimal format;

a processor converting said first endpoint signal and second endpoint signal to represent a two's complement binary format;

providing an interpolation signal representing an interpolation value in a floating point format;

converting said interpolation signal to represent said two's complement binary format;

converting each of said first endpoint signal and second endpoint signal to represent positive values;

generating an interpolation result signal from said interpolation signal and said first endpoint signal and second endpoint signal;

inverting a sign of said interpolation result signal;

generating said pixel signal by converting said interpolation result signal to represent said floating point decimal format; and displaying said pixel signal on said display.

15. The method as recited in claim 14 wherein said step of converting each of said first endpoint signal and second endpoint signal to represent positive values is comprised of a step of adding a bias to each of said first endpoint signal and second endpoint signal.

16. The method as recited in claim 14 wherein said step of converting each of said first endpoint signal and second endpoint signal to represent positive values is comprised of a step of inverting a high order bit of said first endpoint signal and second endpoint signal.

17. A computer system for displaying images comprising:

a storage device including an active object;

a processor being coupled to said storage device, said processor for rendering a scanline corresponding to said active object, said scanline including a plurality of pixel values, said processor for determining a first endpoint and a second endpoint for said active object on said scanline, said processor for adding a bias value to said first endpoint and to said second endpoint, said processor for generating an interpolation result from said first endpoint, said second endpoint and a interpolation weight value, said processor for generating one of said plurality of pixel values using said interpolation result minus said bias value;

a frame buffer, being coupled to said storage device, including a plurality of scanlines representing a frame; and a display device, being coupled to said frame buffer, for displaying said frame.

* * * * *